May 20, 1952  C. W. SACKETT  2,597,675
BANDING MACHINE
Filed Oct. 18, 1946  4 Sheets-Sheet 2
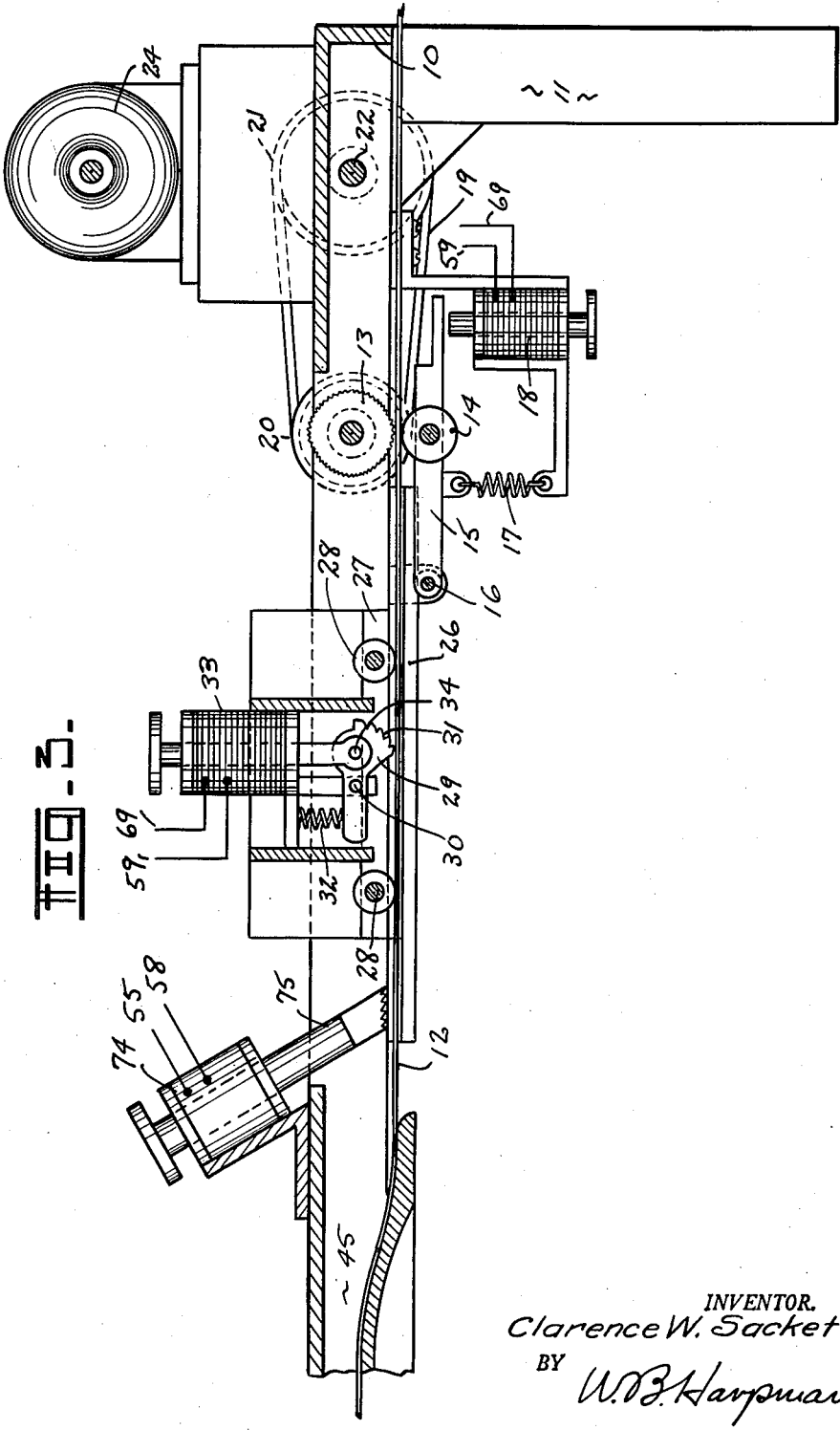
INVENTOR.
Clarence W. Sackett.
BY
W. B. Harpman
ATTORNEY.

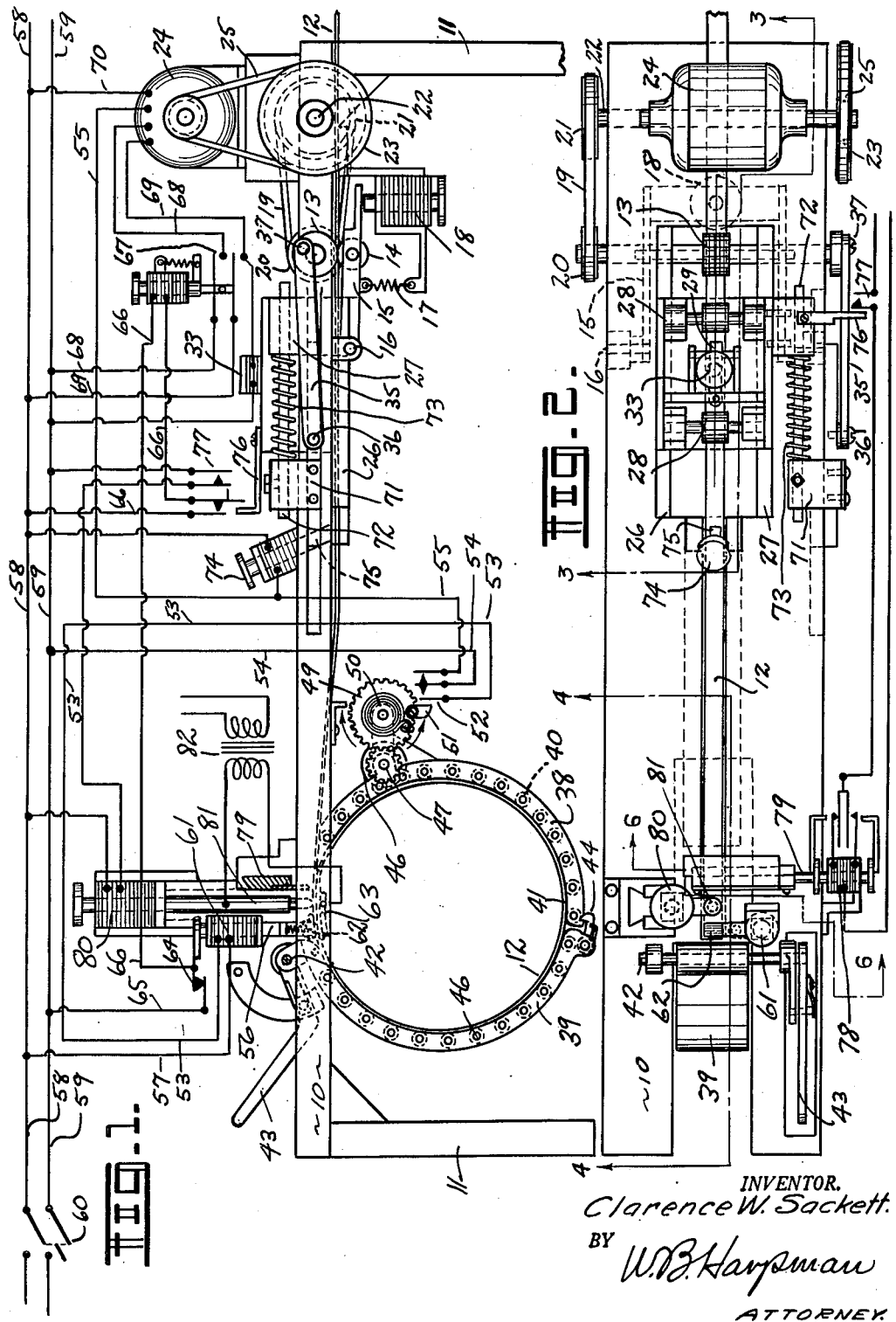

May 20, 1952
C. W. SACKETT
2,597,675
BANDING MACHINE
Filed Oct. 18, 1946
4 Sheets-Sheet 3
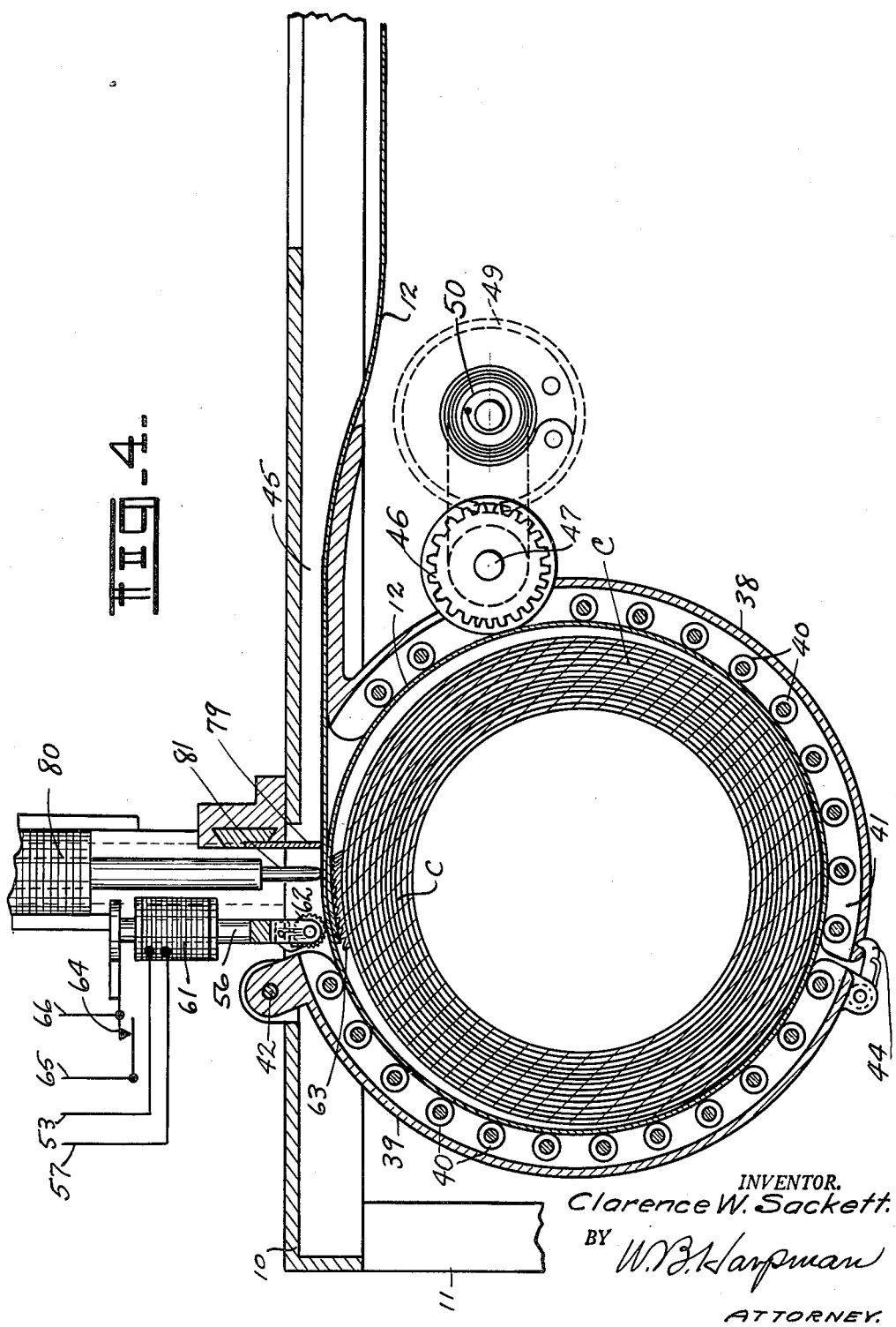
INVENTOR.
Clarence W. Sackett.
BY W.Y.B.Harpman
ATTORNEY.

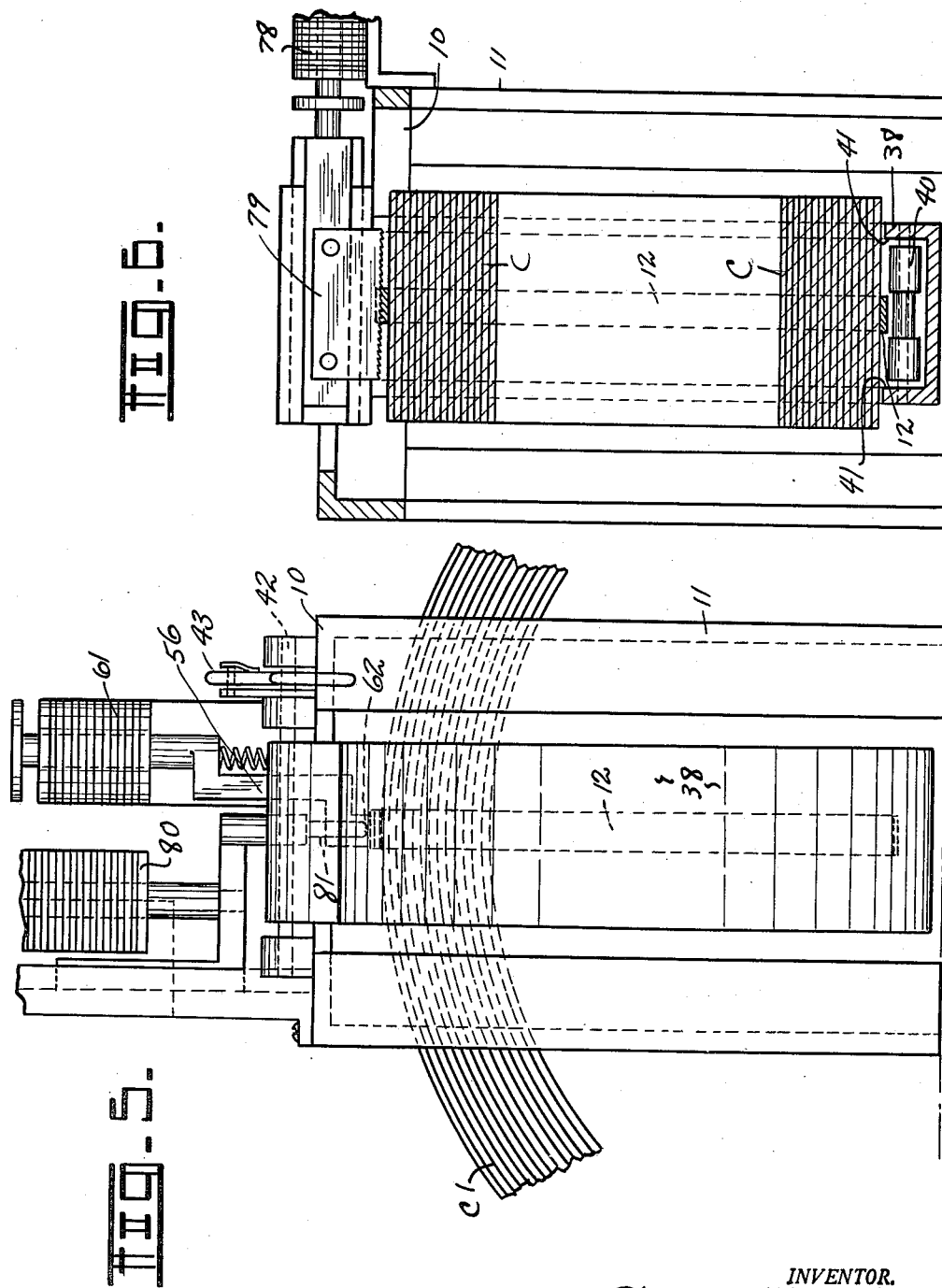

Patented May 20, 1952

2,597,675

UNITED STATES PATENT OFFICE 2,597,675

BANDING MACHINE

Clarence W. Sackett, Warren, Ohio

Application October 18, 1946, Serial No. 704,227

3 Claims. (Cl. 100—31)

This invention relates to a banding machine and more particularly to a machine for automatically applying a weldable banding material about an object and welding it in place thereon.

The principal object of the invention is the provision of a machine for applying banding material such as steel strapping to a coil or other article so as to hold the coil or article under tension and weld the banding material to achieve this result.

A further object of the invention is the provision of a banding machine incorporating means for fitting a section of banding material about an object to be banded, tightening the banding material about the object, welding the banding material in tightneed position and cutting off the connecting banding material.

A still further object of the invention is the provision of a banding machine including means for effecting the sequence of operations necessary in applying a section of a continuous strip of banding material to an article to be banded, guiding the material about the article, welding the material and cutting off the banded and welded section from the continuous strip of material.

A still further object of the invention is the provision of a banding machine including means for guiding a section of banding material about an object to be banded, the said means being movably positioned to enable various articles to be positioned in banding position in the machine.

A still further object of the invention is the provision of a banding machine including means for advancing a section of banding material into banding position about an article and means for determining when the banding material has been positioned about the article to be banded so that the advancement of the banding material may be stopped thereby, and means for reversing the action of the banding material so as to tighten the same about the article being banded.

The banding machine shown and described herein has been devised to form a simple and automatic mechanism for applying, tightening and sealing banding material such as steel strapping about objects to be banded such as coils of steel strip and the like. It is well known that it is a common commercial practice to apply sections of steel strapping to articles so as to form packages thereof or to hold the articles in desired relation such as in coils. It is also known that it is customary to apply the strapping manually to the articles, feed the strapping into tightening devices which tighten it thereabout, and to clamp, lock or otherwise seal the steel strapping in end to end relation to hold it in position on the article banded when the article is banded.

The present invention relates to a machine for accomplishing these several results rapidly and automatically as it enables an article to be banded, the banding material tightened and sealed by welding entirely automatically once the cycle of operations has been started.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of the banding machine including a wiring diagram in connection therewith.

Figure 2 is a top plan view of the banding machine.

Figure 3 is a side elevation of a portion of the banding machine with parts in cross section and taken on line 3—3 of Figure 2.

Figure 4 is a side elevation of a portion of the banding machine with parts in cross section and taken on line 4—4 of Figure 2.

Figure 5 is an end elevation in enlarged detail of the banding machine show in Figure 1.

Figure 6 is an enlarged detail of a portion of the banding machine shown in Figures 1 and 2 and taken on line 6—6 of Figure 2.

By referring to the drawings and Figures 1 and 2 in particular it will be seen that a banding machine has been disclosed which consists of a frame 10 supported on legs 11 and carrying a plurality of mechanisms for respectively advancing a strip of banding material directing it about an object to be banded, tightening the banding about the article, welding the banding in position on the article and cutting off the looped and welded portion of the banding material from the remainder. These several interrelated, mutually cooperative devices comprise the complete banding machine.

In Figures 1 and 2 of the drawings a section of banding material such as steel strapping, indicated by the numeral 12, enters the machine from the right hand end thereof where it passes through a pair of rolls 13 and 14, respectively, the roll 13 being positioned in suitable journals in the frame 10 and having a roughened surface for frictional engagement with the banding material 12. By referring to Figure 3 of the drawings it will be seen that the roll 14 is positioned immediately beneath the roll 13 on a movably positioned frame 15 which is pivoted as at 16 to the frame 10 and the movement of which is controlled by a spring 17 normally biasing the movable frame 15 downwardly and by a solenoid 18 for moving the frame 15 and hence the roll 14 upwardly when energized. The roll 13 is revolved by means of a V belt drive, the V belt being indicated by the numeral 19. The V belt 19 is trained over a pulley 20 in the roll 13 and over a shaft 22 positioned transversely of the frame 10 in the same manner as the roll 13 and to one side thereof. The shaft 22 also carries a secondary pulley 23 and is adapted to be rotated by a motor 24 by reason of an interconnecting secondary V belt 25.

Upon leaving the rollers 13 and 14, the banding material 12 moves along the upper surface of a track 26 and passes beneath a reciprocally mounted carriage 27. The carriage 27 is mounted for alternate back and forth movement lengthwise of the frame 10 immediately above the banding material 12 over the guide 26. The carriage 27 is positioned on wheels 28 and includes an upright frame which pivotally supports a pawl 29, the pivot being indicated by the numeral 30. The pawl 29 includes a toothed end section 31 which is normally biased downwardly and toward the banding material 12 by means of a spring 32. A solenoid 33 is pivotally connected as at 34 to the pawl 29 adjacent the toothed end 31 so that upon de-energization thereof it permits the toothed end 31 of the pawl 29 to move downwardly into engagement with the banding material 12.

By referring again to Figures 1 and 2 of the drawings it will be observed that the carriage 27 is adapted to be moved back and forth by means of a pitman 35 which is pivoted to the carriage 27 as by a pivot 36 and to the roll 13 as by a pivot 37. Thus, the revolving motion of the roll 13 serves to impart reciprocating movement to the carriage 27. It will be observed that the carriage 27 and the mechanism it supports are out of engagement with the banding material 12 at all times except when the solenoid 33 is deenergized. Thus, in the normal procedure of banding an article, the banding material 12 moves through this portion of the machine from right to left. The carriage 27 and its associated mechanisms is employed for reversing the movement of the banding material 12 and tightening it after the foremost end of the banding material has been passed about an object to be banded.

Means for directing the foremost end of the banding material 12 about an object to be banded is included in the machine and comprises a two-part circular guide, a stationary portion of which is indicated by the numeral 38 and a movable portion of which is indicated by the numeral 39. The stationary portion of the circular guide 38 is mounted directly on the frame 10 and immediately therebeneath and is provided with a plurality of rollers 40 in addition to a pair of inwardly extending spaced flanges 41 between which the banding material 12 is guided. The movable portion 39 of the circular guide is pivoted to the frame 10 by a pivot 42 and is provided with a projecting handle 43 so that movement may be imparted to the movable portion 39 of the circular guide so as to move the same into and out of end-to-end engagement with the stationary portion 38 of the circular guide. A spring pressed latch 44 is mounted on the movable portion 39 of the circular guide and engages a keeper slot formed in the stationary portion 38 when the end sections of the stationary and movable guide members 38 and 39, respectively, are in end to end engagement to form a continuous circular track or guide for the banding material 12.

Still referring to Figures 1 and 4 of the drawings it will be observed that the banding material 12, prior to entering the area of the circular guide, first enters a guiding channel 45 and that emerging therefrom, moving toward the left of Figures 1 and 4, it engages the uppermost curved portion of the movable portion 39 of the circular guide and is thereby directed downwardly over a plurality of rollers 46 in the movable portion 39 and by this action its forward motion is reversed as it follows the circular guide. It then passes over the rollers 40 in the stationary portion 38 of the movable guide and eventually completes a circle about the article to be banded which is positioned in or partly within the area defined by the circular guide.

In Figure 4 of the drawings a relatively small coil of material to be banded is shown positioned in the circular guide and this coiled material is indicated by the letter C. The relative spacing of the banding material 12 about the coil C is exaggerated for clarity and in this connection it will be observed that when larger coils of materials are to be banded they may be positioned partially within the circular guide formed by the portions 38 and 39, heretofore described, in transverse relation thereto or at right angles thereto so that the band is positioned about a square or rectangular section of the coil rather than about the whole coil.

In Figure 5 of the drawings a portion of a coil C-1 is shown in transverse relation to the circular guide, supported externally so as to position an upper part of the coil C-1 in banding position.

In Figure 6 a cross section shows a coil C in the same position in the circular guide as in Figure 4 of the drawings.

It will thus be seen that the disclosure so far provides for the feeding of banding material 12 through the rollers 13 and 14 along the upper surface of the guide 26, beneath the carriage 27 disposed above the guide 26 and into the guide channel 45 and into the circular guide movable portion 39 and the stationary portion 38 so as to form a loop about an article to be banded. In order that the advancement of the banding material 12 may be stopped when a complete loop of the same has been formed in the circular guide members 38 and 39, switch means engageable with the advancing banding material 12 and calibrated with respect to the degree of advancement of the said banding material 12 is provided and comprises, as best shown in Figure 1 of the drawings, a roller 46 having a portion of its surface lying in the path of the advancing banding material 12 in the stationary portion 38 of the circular guide so that the roller 46 is caused to rotate by the frictional engagement of the banding material 12 passing thereby. A gear 47 formed on the roller 46 is engaged with a gear 49 which is mounted adjacent the roller 46, both the roller 46 and the gear 49 being positioned on an extension of the stationary portion 38 of the circular guide. The gear 49 is connected by means of a coiled spring 50 with its supporting shaft and carries a dog 51 extending beyond the periphery of the gear 49 for the purpose of engaging a double acting electric switch 52 with which electrical wires 53, 54 and 55 are connected.

In operation, the advancing banding material 12 rotates the roller 46 and hence the gear 47 and the gear 49 so that the dog 51 moves counter-clockwise and eventually trips the electric switch 52. The dog 51 is positioned on the gear 49 so that the degree of travel of the dog 51 about the supporting shaft of the gear 49 corresponds in time to that necessary for the end of the banding material 12 to reach and overlap itself so as to form a complete loop. When the switch 52 is actuated by the banding material 12 having completed its loop formation, certain other actions, electrically controlled, follow to the end that the loop of banding material 12 is held and tightened and eventually cut off and welded. The several portions of the banding machine for accomplishing these actions comprise, for the whole operation with respect to the loop of banding material 12, a solenoid actuated clamping member 56 connected with the switch 52 by the circuit wire 53. A wire 57 completes an electrical circuit through the solenoid actuated clamping member 56 by establishing electrical connection, as does the wire 54 in connection with the switch 52, with a main power line, indicated by the numerals 58 and 59. A master switch 60 controls the main power line and is used for over-all control of the banding machine.

By referring now to Figures 1 and 4 of the drawings the clamping member 56 may be seen to comprise a plunger of a solenoid 61, the plunger having a serrated wheel 62 on its lowermost end which forms the actual means engaging the banding material 12. In order that the end of the banding material 12, which has formed a loop, may be held in stationary relation beneath the wheel 62 of the clamping member 56, a thin pressure plate 63 having a plurality of sharp serrations on its uppermost surface is positioned on the frame 10 and below the wheel 62 of the clamping member 56 the article being banded so that the end of the banding material 12 is positioned between the pressure plate 63 and the wheel 62 of the clamping member 56. The downward pressure of the clamping member 56, as exerted by the solenoid 61 when energized, serves to hold the end of the banding material 12 firmly in position on the sharply serrated uppermost surface of the pressure plate 63.

Still referring to Figures 1 and 4 of the drawings it will be observed that when the solenoid 61 is actuated the downward travel of the clamping member 56, which forms the plunger of the solenoid 61, causes an electrical switch 64 mounted thereon to close thereby completing an electrical circuit by way of wires 65 and 66 through a relay actuated electrical switch 67. The relay actuated electrical switch 67 opens a circuit normally supplying the electric motor 24, the circuit wires being indicated by the numerals 68 and 69 and they will be observed to connect, respectively, with the main power line circuit wires 58 and 59, respectively. Simultaneously with this action the electrical switch 52 will have closed a circuit between the wires 54 and 55 and thereby completed a reversing circuit to the motor 24 causing it to reverse the direction of rotation of the roller 13, heretofore described. The reversing circuit comprises the wires 55 and 70 which communicate with the switch 52 and hence the wire 54 and the main circuit wire 59 and the main circuit wire 58, respectively. The reversing of the direction of rotation of the roller 13, which had heretofore been advancing the banding material 12 from right to left of the banding machine (as viewed in Figure 1), now serves to move the banding material 12 from left to right thereby tightening the band material 12 and tending to draw the loop formed therein about the article being banded.

Simultaneously with the reversing action of the motor 24 as controlled by the relay switch 67, the solenoid 33 is de-energized thereby permitting the toothed end 31 of the pawl 29 to drop into engagement with the upper surface of the banding material 12. As the carriage 27 is reciprocated, as heretofore described, this action is imparted through the pawl 29 to the banding material 12 to forcefully move it. As the reciprocating movement is not affected by the reversal of the motor 24, the toothed end 31 of the pawl 29 begins to tighten the banding material 12 with respect to the article being banded as it urges the banding material 12 from left to right as viewed in Figures 1, 3 and 4 of the drawings. The solenoid 18 is supplied with power from the same circuit that supplies the solenoid 33 and it is therefore de-energized by the opening of the relay switch 67, as heretofore described. This permits the relaxation of tension of the rollers 14 and 13 with respect to the banding material 12. The tightening action on the banding material 12 is thus supplied fully by the reciprocating carriage 27 and its associated mechanisms including the pawl 29.

The carriage 27 includes a movable portion 71 to which the pitman 35 is directly pivoted by the pivot 36, the movable portion 71 of the carriage 27 being connected to the remainder of the carriage 27 by a shaft 72 reciprocatively mounted in an extension of the carriage 27. A spring 73 is positioned about the shaft 72 and between the movable portion 71 and the carriage 27. Thus the reciprocating motion imparted to the carriage 27 is always imparted through the spring 73. In operation this construction enables the main portion of the carriage 27, which carries the solenoid 33 and the pawl 29, to move the banding material 12 to the right, in a tightening action, and as the tension on the banding material 12 increases the spring 73 will become compressed as the carriage 27 alters its position in direct ratio to the degree of tension exerted through the pawl 29 on the banding material 12 in the tightening operation.

The banding material 12 is held in tightened relation by two means, the first of which is the serrated wheel 62 on the plunger 56 of the solenoid 61. The serrated wheel 62 is controlled by a ratchet lever pivoted to the plunger 56 as best shown in Figure 4 of the drawings. Thus, the movement of the banding material 12 is permitted during a tightening action and held against loosening when tightened. The second mechanism for accomplishing this action and insuring the tightening of the band is, as shown in Figures 1 and 3 of the drawings, a plunger 75 of the solenoid 74. A lowermost portion of the plunger 75 is serrated so as to hold the band against a loosening movement with respect to the article being banded. The solenoid 74 is set at a desirable angle of inclination to achieve its purpose and it is energized by the switch 52 at the same time of the reversal of the motor 24 and at which time the tightening action on the banding material 12 is initiated.

By again referring to Figures 1 and 2 of the drawings it will be observed that when the tightening action of the carriage 27 has moved the banding material 12 from left to right in the machine a sufficient distance to properly tighten the band about the article being banded, the spring 73 will have been compressed by the progressive movement of the main portion of the carriage 27 carrying the pawl 29 engaging the banding material 12, and that at such a predetermined time as the banding material is tight, a finger 76 will engage an electrical switch 77 and break the circuit energizing the relay switch 67 which in turn controls the solenoid 33 and the pawl 29. The switch 77 will energize two circuits, one of which controls a vibrating solenoid 78, as shown in Figure 2, to energize a transversely located saw 79 which will cut off the banding material 12 at a point forward of the pressure plate 63 which underlies the overlapped banding material 12 on top of the article being banded.

Simultaneously with the closing of the circuit controlling the solenoid 78 and hence the saw 79, a second circuit is closed, as shown in the wiring diagram in Figure 1, which closes a circuit through a solenoid 80, a plunger 81 of which comprises a welding electrode in combination with the pressure plate 63 which forms the ground for the weld. Thus, simultaneously, the circuit to the motor 24 is broken, the energization of the solenoid 33 lifts the pawl 29 from the banding material 12, the saw 79 is operated to cut the band and the band is welded by the energization of the solenoid 80. A suitable welding circuit such as shown in Figure 1 is employed to effect the actual welding and a welding transformer is symbolically shown and indicated by the numeral 82.

The removal of the article being banded from the banding area permits the gear 49 to be rotated by the spring 50 hence resetting the switch 52 and thus automatically setting all of the parts of the machine for the next banding operation.

It will thus be seen that an efficient and entirely automatic banding machine has been disclosed which feeds banding material automatically, forms the banding material about an article being banded, stops the feeding action, holds the loop of banding material in looped formation, tightens the banding material on the article being banded, holds the banding material in tightened relation, cuts off the banding material and welds the looped portion of the banding material about the article, all in an orderly sequence rapidly and efficiently.

It will also be seen that the banding machine is capable of use in banding small coils of material or other articles positioned axially of the banding area and that it is equally efficient in use in banding large coils, the upper portions of which are positioned transversely with respect to the portion of the machine in which the loop of banding material is formed.

Having thus described my invention, what I claim is:

1. In a banding machine having guide means positioned about an object to be banded, rolls for advancing banding material in one direction into the said guide means, the rolls being mounted for movement toward and away from each other, a rotary switch operable by said banding material passing around the said guide means and controlling the position of the said rolls, a reciprocatively actuated carriage having a banding material engaging member thereon, and an arm pivoted to one of the said rolls and to the said carriage for imparting movement to the latter, the said member comprising a pawl having means normally urging the said pawl into engagement with the said banding material and a solenoid on said carriage for moving the pawl to inoperative position, the said carriage and pawl being adapted to move the banding material in the opposite direction so as to tighten the same about an object being banded, the said rotary switch de-energizing the said solenoid on the carriage simultaneously with the movement of the rolls away from each other whereby the direction of the advancing banding material may be reversed.

2. In a banding machine, the combination of a pair of driven rolls for advancing banding material into banding position about an object to be banded, one of the said rolls being movable toward and away from the other, and electrical means for moving the said movable roll toward the other roll, and separate means for reversing the band feeding action upon a loop of banding material being formed about the object to be banded, said separate means including a rotary electrical switch actuated by frictional engagement of the said banding material thereagainst, the said electrical means for moving the said movable roll being subject in operation to said rotary switch, and means for reversing the direction of the said banding material and comprising a carriage movable longitudinally of the said banding material, a crank arm connecting the said carriage with one of the said rolls, and means on the said carriage for frictionally engaging the said banding material so as to move it in a direction opposite of that movement imparted by the said rolls, the said means for engaging the banding material being subject in operation to the said rotary switch.

3. In a banding machine having guide means removably positioned about an object to be banded, a pair of rolls for advancing banding material in one direction into the said guide means, one of the said rolls being rotatably mounted in the said machine, a frame pivotally mounted in said machine and the other of the said rolls being rotatably mounted on said frame whereby the last mentioned roll may be moved toward and away from the other roll, a solenoid for moving the said frame whereby the one roll may be moved toward the other, switch means operable by the said banding material passing around the said guide means controlling the operation of the said solenoid, a reciprocatively actuated carriage having a banding material engaging pawl thereon and an arm pivoted to one of said rolls and to said carriage for imparting movement thereto, means normally urging said pawl into engagement with the said banding material and a solenoid on said carriage for moving the pawl away from said banding material, the said carriage and pawl being adapted to move the banding material in the opposite direction so as to tighten the same about an object being banded, the said switch means de-energizing the said solenoid on the carriage simultaneously with the deenergization of the first mentioned said solenoid whereby the direction of the banding material may be re-reversed.

CLARENCE W. SACKETT.

REFERENCES CITED

The following references are of record in the file of this patent:

UNITED STATES PATENTS

| Number | Name | Date |
|---|---|---|
| 21,540 | Sherwood | Sept. 14, 1858 |
| 1,650,843 | McChesney | Nov. 29, 1927 |
| 1,650,844 | McChesney | Nov. 29, 1927 |
| 2,371,806 | Cooper | Mar. 20, 1945 |
| 2,409,652 | Workman | Oct. 22, 1946 |
| 2,416,859 | Vining et al. | Mar. 4, 1947 |
| 2,438,386 | Chamberlain | Mar. 23, 1948 |

FOREIGN PATENTS

| Number | Country | Date |
|---|---|---|
| 325,285 | France | May 11, 1903 |
| 868,766 | France | Oct. 20, 1941 |